United States Patent [19]
DeFilipps et al.

[11] Patent Number: 5,455,921
[45] Date of Patent: Oct. 3, 1995

[54] REDUNDANT MIL-STD-1153B MODEM

[75] Inventors: James M. DeFilipps, Tacoma; Gary Wood, Seattle, both of Wash.

[73] Assignee: The Boeing Company, Seattle, Wash.

[21] Appl. No.: 945,393

[22] Filed: Dec. 19, 1986

[51] Int. Cl.[6] ............. G06F 13/00; G06F 13/14; G06F 13/42

[52] U.S. Cl. .......... 395/494; 364/222.2; 364/238.5; 364/270.6; 364/DIG. 1; 364/929; 395/183.19; 395/183.2; 395/285; 395/309; 395/892

[58] Field of Search ............. 364/200 MS File, 364/900 MS File; 375/8

[56] References Cited

U.S. PATENT DOCUMENTS 4,136,400  1/1979  Caswell et al. ............ 364/900

Primary Examiner—Gregory C. Issing
Attorney, Agent, or Firm—John C. Hammar

[57] ABSTRACT

An improved modem is operative for interfacing a computer subsystem with a data bus system. The computer subsystem may be designed-to process digital information in accordance with certain timing criteria that is incompatible with the operational timing criteria of the data bus system. The modem includes a programmable subsystem interface that permits interfacing the subsystem's timing criteria with the data bus system's timing criteria.

4 Claims, 10 Drawing Sheets

5,455,921

REDUNDANT MIL-STD-1153B MODEM

TECHNICAL FIELD

This invention relates to modulator/demodulator devices, or modems, which in general convert digital signals into tones and vice versa. More particularly, this invention relates to modems that have redundant capabilitites, and which are adapted to meet certain military standards governing the operation of multiplex data bus systems, such standards being hereafter identified and referred to as "MIL-STD-1553B."

BACKGROUND ART

MIL-STD-1553B is a military standard or set of standards approved for use by all agencies and departments of The Department of Defense. The purpose of the standard is to provide requirements for standardizing internal time division command/response multiplex data bus techniques, which are to be utilized in systems integration of certain subsystems onboard aircraft, ships, and other military vehicles. The standard therefore defines operational criteria for a multiplex data bus, including electrical and functional formats associated therewith. MIL-STD-1553B is included in a handbook entitled "MIL-STD-1553B Multiplex Applications Handbook" which is a public document that can be obtained from The Naval Publications and Form Center at 5801 Tabor Avenue in Philadelphia, Pa. 19120. This handbook is incorporated herein by reference.

The purpose and function of a modem is, of course, well-known in the art. In the past, certain attempts have been made to design dual redundant modems that fully comply with MIL-STD-1553B. Some of the designs have had certain deficiencies, the most common of which is they are difficult to interface with.

In the past, a modem designed in accordance with MIL-STD-1553B has been typically designed to interface with a particular multiplex data bus. Usually, certain operational differences exist between data buses when they are used in connection with different systems subsystems, even though all technically comply with MIL-STD-1553B. The reason for this is that use of a system or systems in different environments can dictate different and sometimes quite unique applications for computer hardware and software. This is reflected by certain unique characteristics in operation of the particular data bus used in connection with the system, and in any modem further used in connection therewith. The modem is therefore generally designed as an integral part of the system, and this makes the modem difficult to use if it is desired to interface one type of system or subsystem with another.

As a practical matter, accomplishing this means that certain design changes must be incorporated into the modem which, in some cases, can be extremely difficult. This usually involves the design and incorporation of additional circuit cards into the modem, for example, and changes of this nature are time consuming and are made further difficult by the fact that MIL-STD-1553B provides somewhat flexible definitions for modem mode code usage. As started above, certain modem designs in the past have been known to have inadequately identified mode code usage, or in some cases MIL-STD-1553B mode codes are not used at all.

This invention provides a built-in interface that is easy to use for adapting a modem constructed in accordance with this invention to different MIL-STD-1553B systems. The invention provides the user with options that make modem adaptability easy to accomplish without need extensive work or redesign. Additional features and advantages of the invention will be presented below.

DISCLOSURE OF THE INVENTION

As is well-known, computers and computer-related devices are digital systems that process "bits" of information. An inherent aspect of digital processing is the sequential transfer of bits in the form of electrical signals from one device to another in a particular computer, or from one computer to another. Such transfers are measurable in terms of "bits per second" which is often referred to as a "baud rate." Further, during bit transfer, certain preselected periods of time are typically defined during which the transfer of certain numbers of bits occur, corresponding respectively to transfer of data, address, word, instruction information and the like. This, in combination with the use of baud rates, and other parameters, defines operational timing criteria for digital processing in a computer system, including sequential transfer of digital information from one point to another.

A data bus system designed for a particular application is typically designed to operate in accordance with certain timing criteria. By way of illustrative example, a data bus system may be used to operationally interconnect a plurality of computer systems, hereafter a plurality of "subsystems". To accomplish bidirectional transfer of digital information of the type noted above from one subsystem to another, the subsystems and the data bus system must be compatible, i.e. they must be operable to process bits in accordance with the same timing criteria. However, in certain situations one or more subsystems may be designed to operate in accordance with timing criteria that is slightly different or incompatible with the data bus system's timing criteria. It is an object and advantage of the present invention, therefore, to interface such a subsystem with the data bus system.

The present invention provides an apparatus that has a programmable subsystem interface. This interface adapts or interfaces a subsystem operable in accordance with certain timing criteria with a data bus system operable in accordance with different timing criteria. Generally, it includes an inverting transceiver, a word counter, latch means, an interface logic device and a monitor logic device. The inverting transceiver is operative for bidirectional transmission of data signals between the data bus system and the subsystem. The word counter is operative for transmission of word count signals between the data bus system and the subsystem. The latch means is operative for transmission of subaddress signals between the data bus system and the subsystem. The interface logic device and the monitor logic device provide a means for interface sequencing or, in other words, for adjusting sequential timing of the above-noted bidirectionally transmitted signals between the data bus system and the subsystem, so that sequencing of such signals substantially matches the timing criteria of the subsystem when transmission is from the data bus to the subsystem, and vice versa.

Both the interface logic device and the monitor logic device are programmable devices. The interface logic device is operatively connected to the inverting transceiver, word counter and latch means and controls sequential timing of the signals transmitted through each, and determines the direction of such transmissions. The monitor logic device is operatively connected to the interface logic device and appropriately commands the interface logic device to control sequential timing of the signals.

A further advantage of the invention is that it provides an apparatus with above capability that is further adaptable for use in accordance with redundant data bus systems. The apparatus has dual channels, one for each data bus system. Each channel has a digital fail-safe timer. Further, the apparatus also includes preselected hard wire connections which provide the user with selectable input and output control signal lines, such connections are changeable by the user, however.

Although the invention will hereinafter be referred to in general as a modem, a person skilled in the art would realize the possible applications of the invention may not include modulation/demodulation in the strict sense where electrical signals indicating binary information are converted into audible tones. This, and the above-mentioned features and advantages of the invention will be fully understood by a person skilled in the art upon reading the remaining text of this application, and by considering such text in conjunction with the various drawings submitted herewith.

BRIEF DESCRIPTION OF THE DRAWINGS

In the drawings, like reference numerals, letters, terms, signal names and legends refer to like parts and details throughout the drawings; pin numbers are identified for individual integrated circuits and other devices; user mode code usage is identified according to MIL-STD-1553B.

BEST MODE FOR CARRYING OUT THE INVENTION

A. General Description

Figure 1:
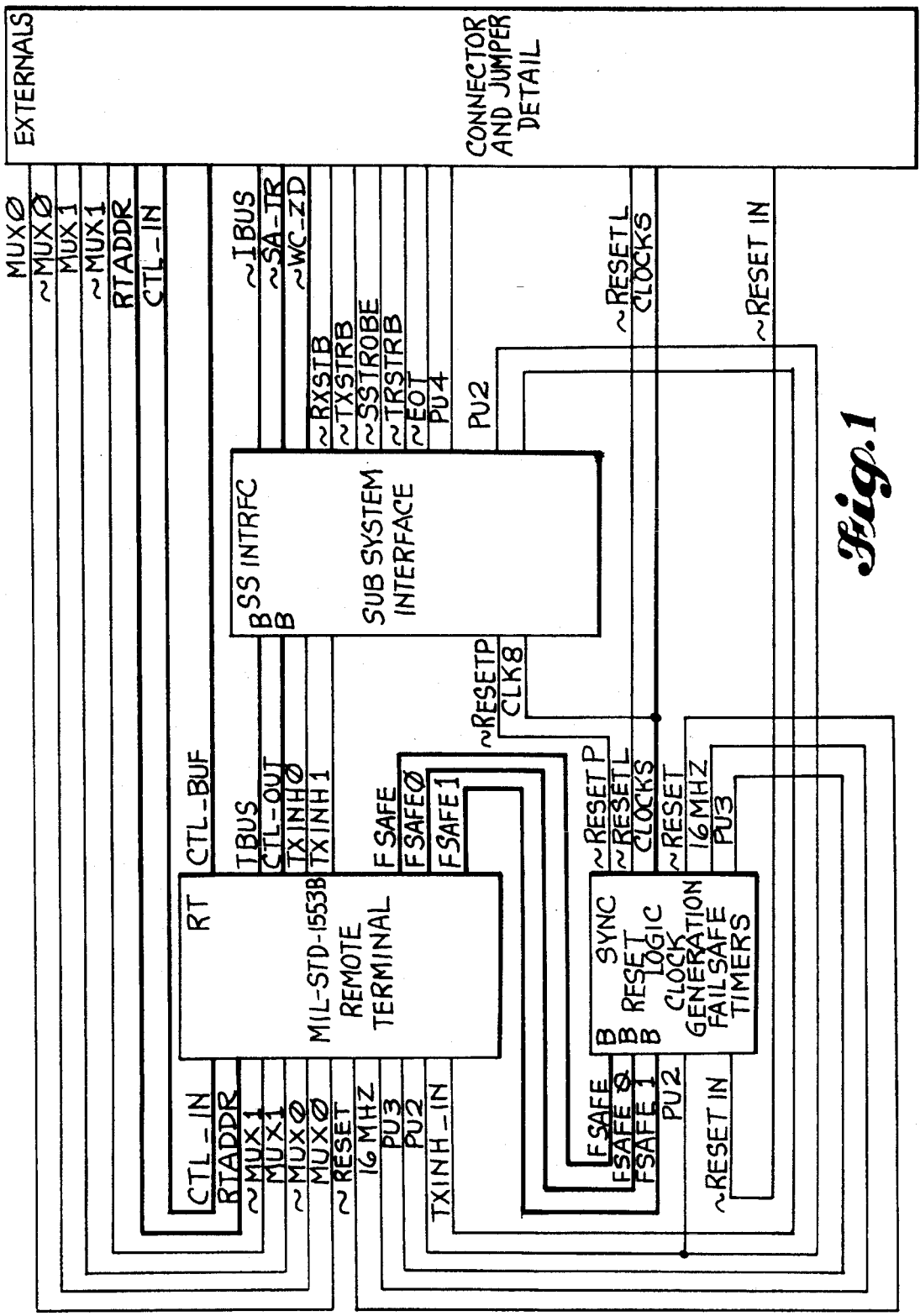
FIG. 1 is a block diagram showing the invention.

A modem constructed in accordance with the invention includes many parts and details. For the sake of simplicity, most of these parts and details are shown in the drawings and are identified by terms and part numbers which would be familiar to a person skilled in the art. The various names and codes will be identified in a glossary of terms which will follow.

The invention utilizes certain digital logic devices, many of which are integrated circuits or "chips." These devices are identified in the drawings and in the following description by a "U" number, positioned adjacent respective devices, where an identifying numeral is used in connection with this letter. Pin numbers for each device are also indicated in the drawings. As will become apparent, certain ones of the devices are of an off-the-shelf nature and do not require programming by a maker of the invention. Certain others do require programming. The programs required are included herewith as Appendix A and will be further discussed hereinbelow.

As would be familiar to a person skilled in the art, terms in the various drawings are names or codes that represent signal names. Many appear to be converse because the receive/transmit inputs/outputs of one device, such as U1 in FIG. 2A, for example, are connected to the correspondingly converse outputs/inputs of another device, such as U7 in FIG. 2B.

Figure 2A:
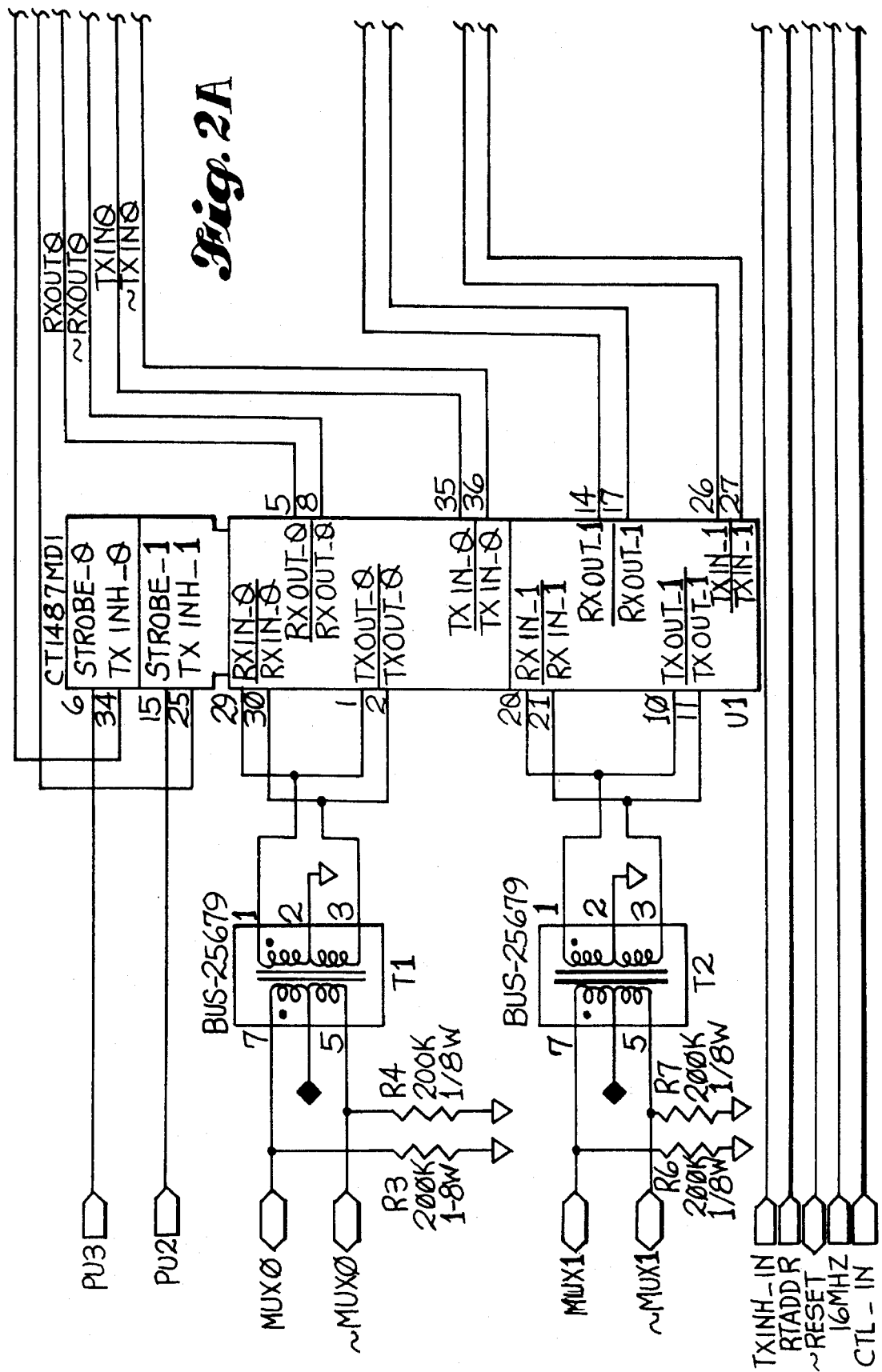
FIGS. 2A and 2B are schematics which are to be taken together, and show circuitry associated with a remote terminal portion.
Figure 2B:
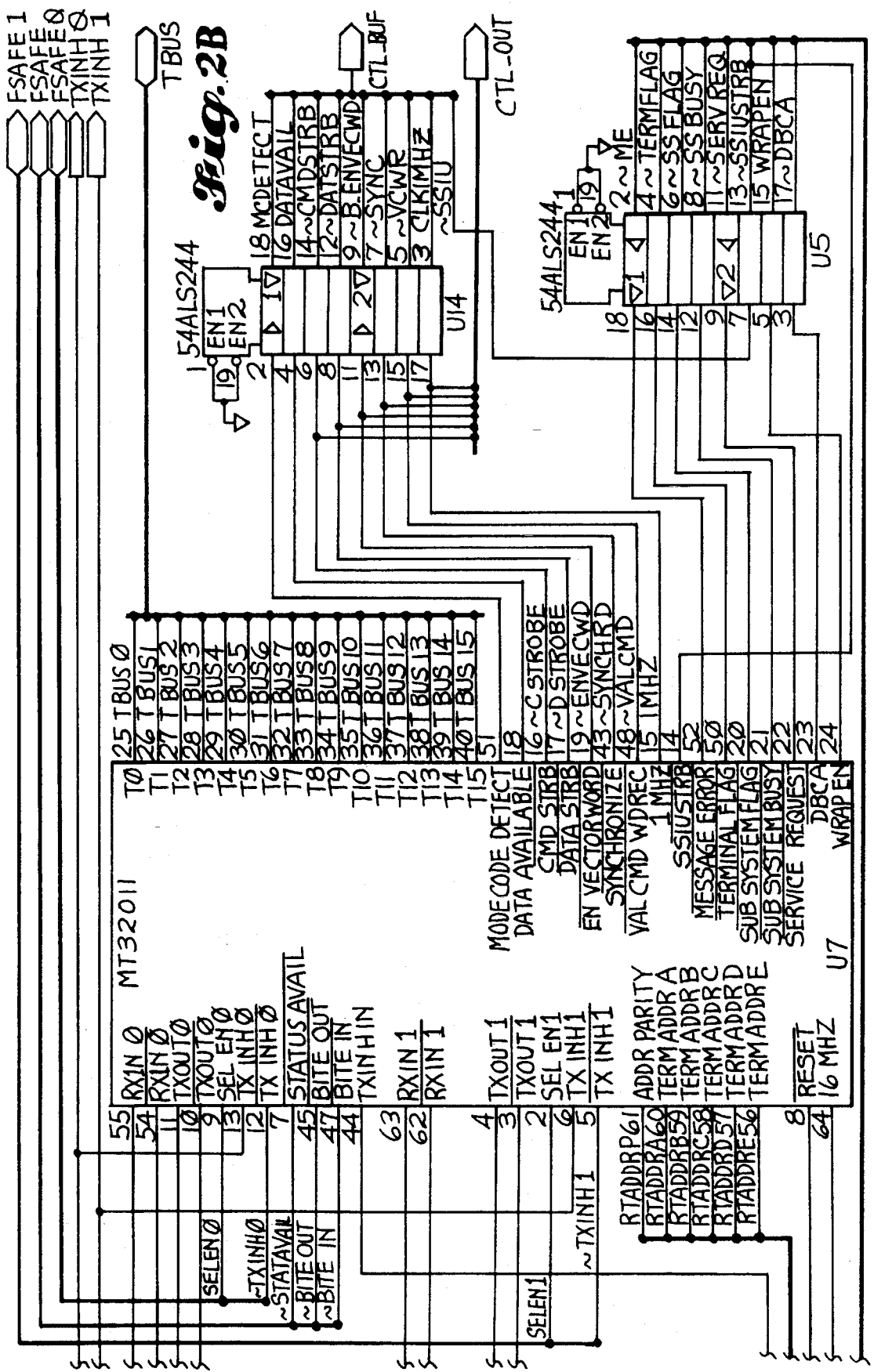

In FIGS. 2A and 2B, therein is shown circuitry which makes up a portion of the invention that functions as a remote terminal. The circuitry in these figures generally corresponds to that block in FIG. 1 identified by the legend "MIL-STD-1553B Remote Terminal". FIGS. 2A and 2B show four devices U1, U7, U5 and U14. The modem has dual redundant capabilities, or the capability to operate on one of two channels, which is indicated respectively in FIG. 2A by signal connections MUX0 and MUX1, including negative assertions thereof. The signal connections may be directly connected to a multiplex databus, such as a twisted, shielded, avionic databus, for example, and which would be familiar to a person skilled in the art. Depending on which channel (channel 0 or 1) is used at any particular time, data bus signals cross either of two pulse transformers T1, T2.

The device U1 is a hybrid subassembly that provides a transceiver function for a remote terminal, indicated by U7 in FIG. 2B. Transceiver U1 has dual, identical isolated transceivers as indicated in FIG. 2A by the separate data and control sections. The transceiver U1 provides voltage level translation between TTL (Transistor-Transistor Logic) levels and the particular bi-phase format which is specified by MIL-STD-1553B.

The line breaks on the right-hand side of FIG. 2A correspond to the line breaks on the left-hand side of FIG. 2B. Device U7 is a hybrid subassembly, and has the following three capabilities: (a) provides a dual Manchester bi-phase encoder/decoder function; (b) performs protocol checking and implementation per MIL-STD-1553B; and (c) provides FIFO (first-in-first-out) memory for message data queing. U7 also provides inputs for status word bits and a wrap-around test signal.

Devices U5 and U14 in FIG. 2B are microcircuits where U5 serves as a buffer between the modem's subsystem interface (see "Subsystem Interface", FIG. 1), which will be further described later. U5 also includes an element that is used as a driver to monitor signals that synchronize data transfers with the subsystem interface. U14 also provides drivers for control signals that transmitted through the data bundle lines identified by CTL BUF (see Glossary, paragraphs 6(a)–(1)).

Figure 3A:
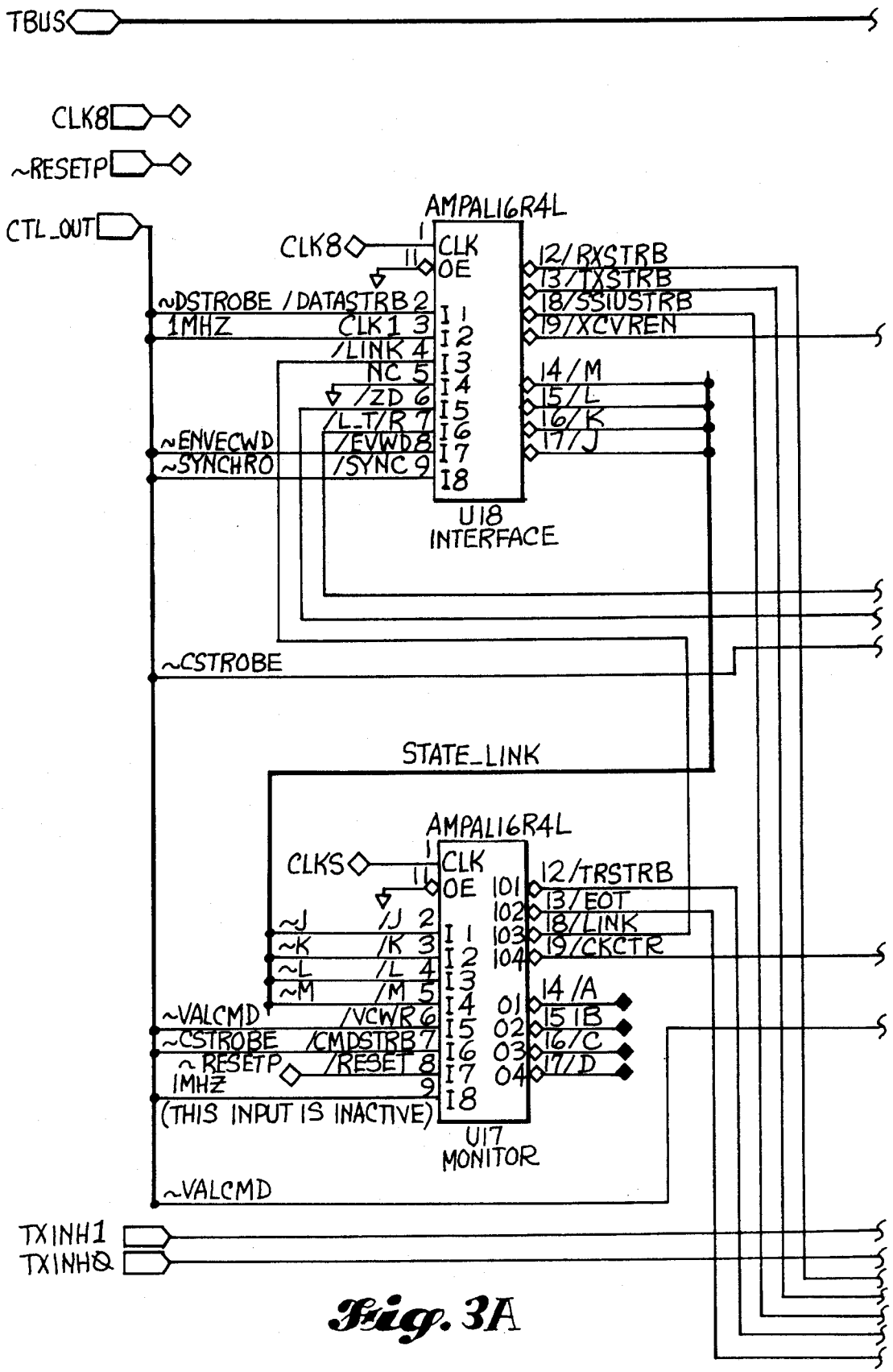
FIGS. 3A and 3B are schematics which are to be taken together, and show circuitry associated with a subsystem interface.
Figure 3B:
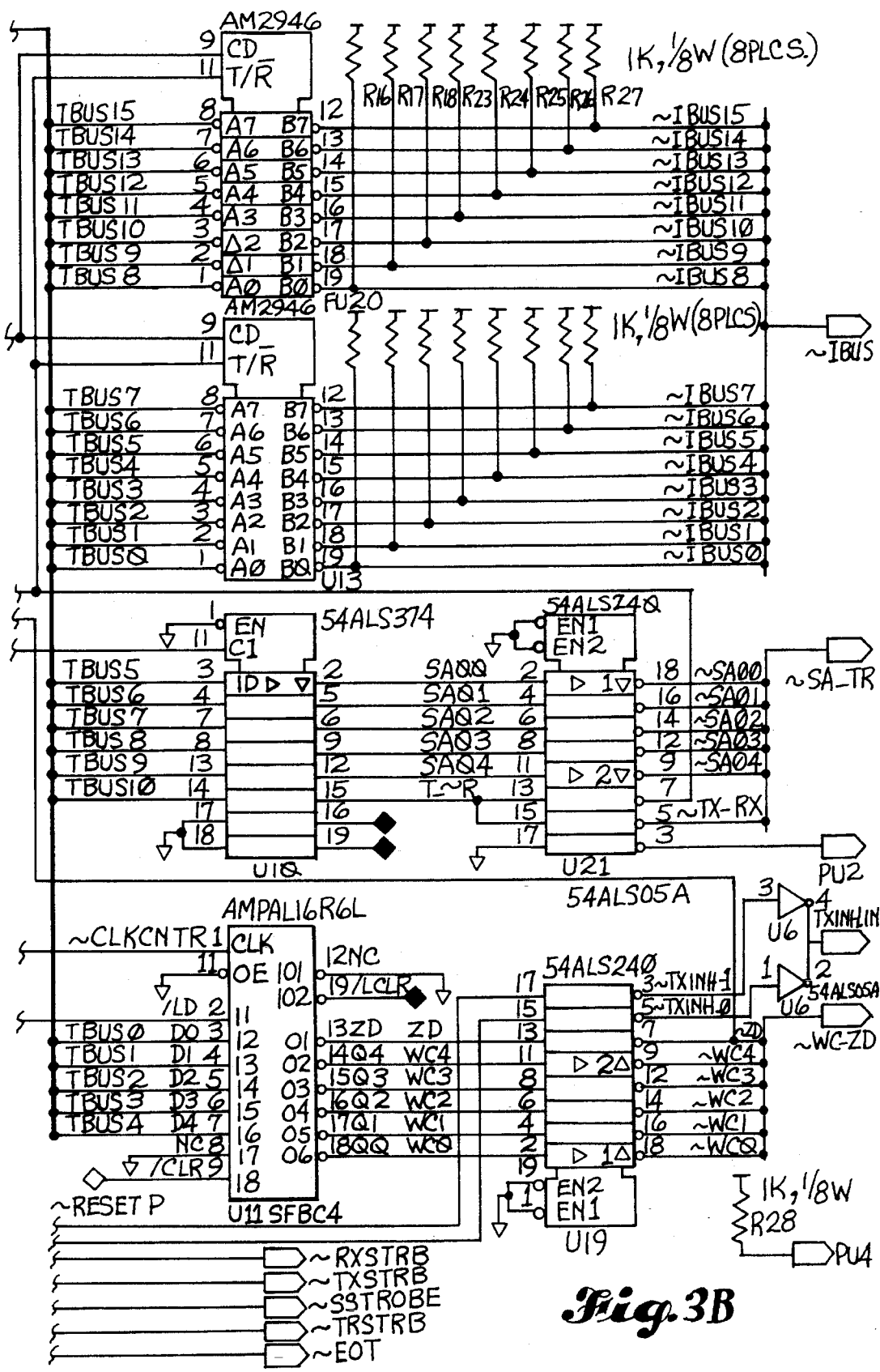

FIGS. 3A and 3B, when taken together, generally correspond to the subsystem interface shown in FIG. 1. The devices indicated by U17 and U18 in FIG. 3A are fuse-programmable logic devices (PLD) which perform interface sequencing as a linked set of parts. The partitioning of logic between these devices U17, U18 is a function of the particular choice of parts in this preferred embodiment. U17 is a monitor PLD. It provides for initialization of interface sequencing and it tests message validity signaling at appropriate points in a message transfer sequence and checks to make sure the proper progression of the message sequence is made. If a message transfer meets all criteria for validity, determination of the transfer is indicated by U17 to the subsystem. If all criteria for a valid message transfer validity are not met, U17 prevents the transfer of potentially corrupt data across the subsystem interface, and recovers the monitoring sequence to a state of readiness for the next message transfer. U17 also generates control signals for a message word counter, U11, which is shown in FIG. 3B.

U18 is an interface PLD, which operates as subordinate linked state machine under the control of the monitor PLD U17. U18 provides tristate control over bidirectional transceivers in the modem data path. Both transmit and receive data processing paths are handled in its logic. It develops counting pulses for the word counter U11 in FIG. 3B, in both transmit and receive cases, permitting the synchronous zero detect output from the word counter U11 to steer the termination of the interface PLD U18 logic sequences.

When the modem is in a transmit mode, the interface PLD U18 is responsible for arbitrating usage of the modem's various internal parallel data lines by synchronizing data transfers from the subsystem to a one megahertz reference signal. Data strobes are sent to the subsystem by U18 to provide a self-timing interface.

Similar to FIGS. 2A and 2B, line breaks shown on the right-hand side of FIG. 3A correspond to like line breaks on the left-hand side of FIG. 3B. In FIG. 3B various devices are shown. U20 is an inverting transceiver that provides bidirectional isolation and buffering between the upper byte of an internal "T-bus" and the subsystem "I-bus". U13 is an inverting transceiver that provides bidirectional isolation and buffering between the lower byte of the internal T-bus and the subsystem I-bus. U10 is an edge-triggered data latch that stores the subaddress and transmit/receive bits of a message command word. U11 is a synchronous five bit, loadable word counter having the capability for synchronous detection of the condition of a word count equal to zero. U12 is an inverting driver that provides the necessary current levels to extend the latched subaddress and transmit/receive information bits to the subsystem. Lastly, U19 is also an inverting driver that provides present word count and zero word count detection information to the subsystem. Two of the drivers in U19 also serve as general purpose inverters that invert the sense of TXINH1 and TZINH0 (see Glossary, paragraphs 18 and 19) signals prior to a wired-OR connection, which yields a composite TXINH_IN signal used to monitor the transmitter status of both channels in the modem.

Figure 4:
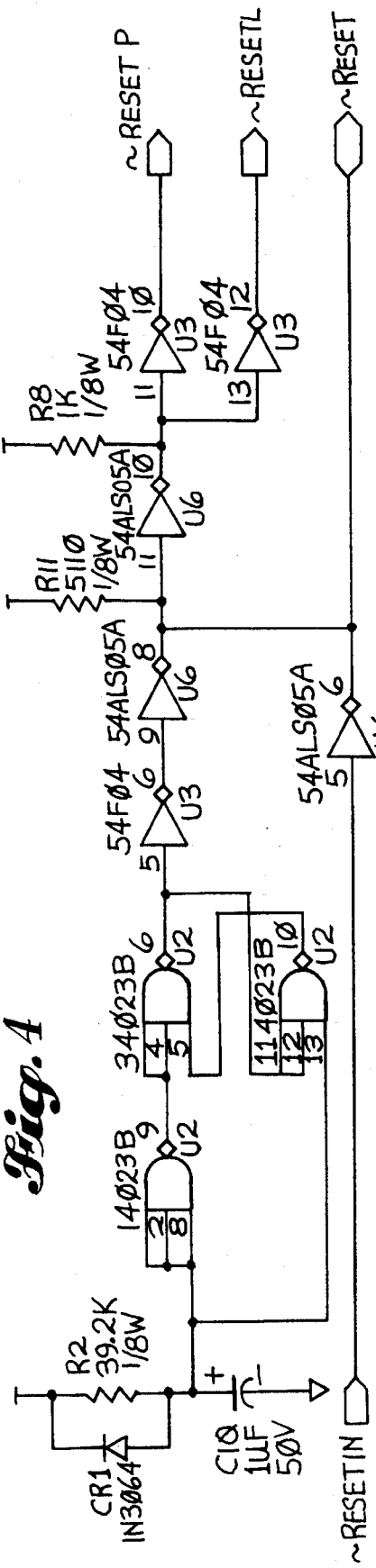
FIG. 4 is a schematic showing circuitry associated with reset and timing logic.

FIG. 4 shows modem circuitry which provides reset and timing logic for the modem. RESETIN (see Glossary, paragraph 4) provides a modem user with the ability to externally introduce a reset signal into the modem electronics. This is a convenience that offers greater flexibility to the user.

Figure 5:
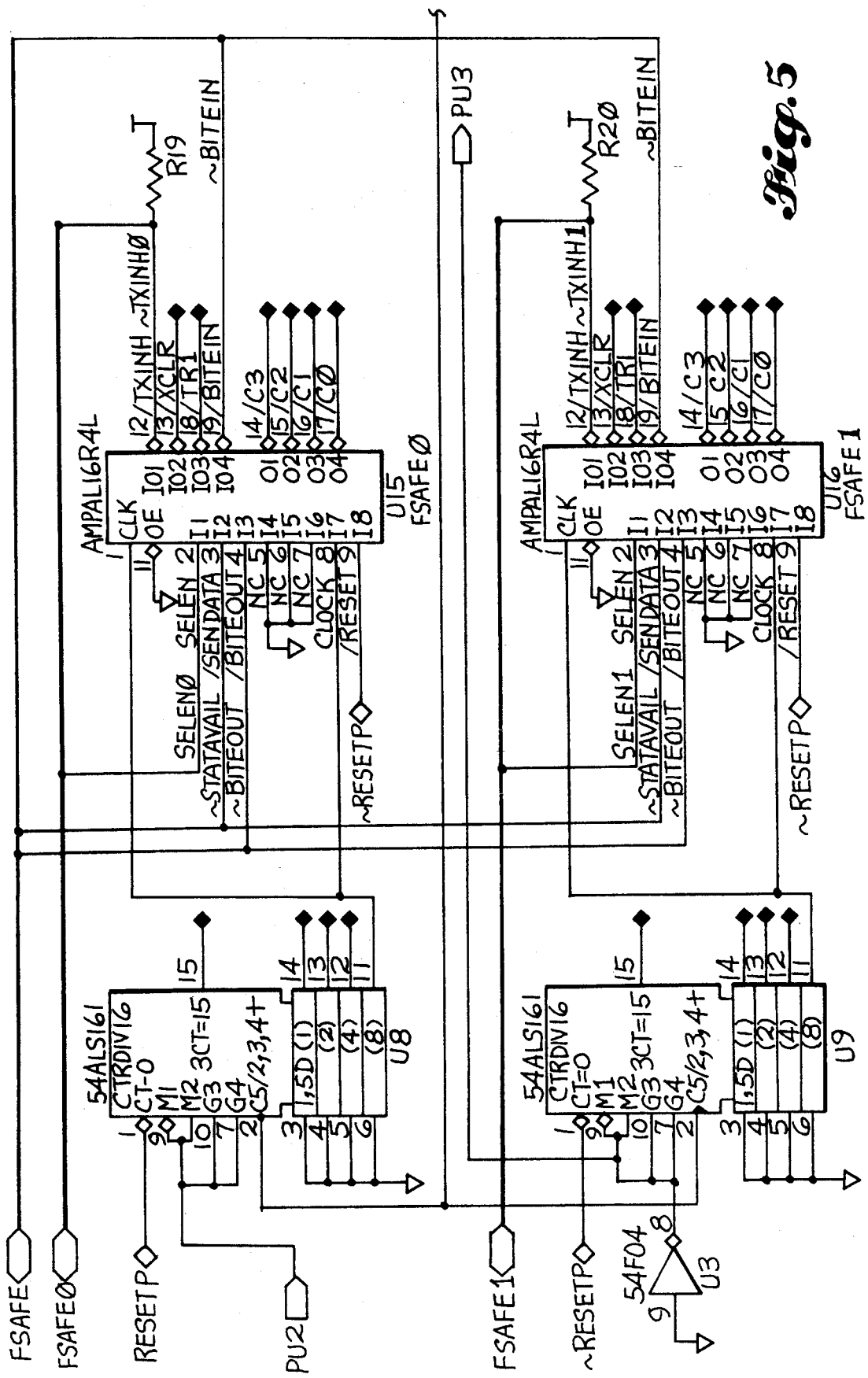
FIG. 5 is a schematic showing circuitry associated with fail safe timers.

FIG. 5 shows modem fail-safe timer circuitry. A terminal fail-safe time out function is required by MIL-STD-1553B. FSAFE, FSAFE0 and FSAFE1 (see Glossary, paragraph 16) are designations for signal groups fulfilling this function. FSAFE includes triggering and self-test signals that are common to each of the modem's transmit/receive channels. FSAFE0 and FSAFE1 are timer signals which are unique to an associated channel.

Four devices U8, U9, U15, and U16 are shown in FIG. 5. U8 is a four bit counter, operated as the most significant four bits of a modulo-1024 divider that provides a 15.625 KHZ clock signal to the fail-safe timer for one of the modem's channels (channel 0). U15 is the terminal fail-safe timer for channel 0 and receives the 15.625 KHZ clock signal from U8.

As described above, the terminal fail-safe timer function is required by MIL-STD-1553B. If one of the terminals interfaced to the data bus should fail to cease transmitting at a proper boundary of a message, all other terminals on the data bus would be unable to communicate unless there was a redundant data bus available. Even if the redundant data bus was present, a scenario could be envisioned whereby the run-away transmissions contain valid message words, thus causing the remaining terminals to interrupt communications on the alternate data bus to process what appears to be a stream of superceding valid commands on the bus dominated by the defective terminal. This single-point failure could clearly cause catastrophic effects within a system that employs the data bus and is eliminated by the terminal fail-safe timer function.

Preferably, the fail-safe timer function is of a digital nature. This is preferred because its triggering and timing characteristics are well-defined and can be analyzed by using digital fault grading techniques. Trigger signals are developed for either the beginning of a transmission sequence or for the initiation of a self-test. The trigger is qualified by the SELEN (see Glossary, paragraphs 22 and 29) input to select a specific timer to the specific channel that is enabled. A synchronous trigger condition will be synchronized to the next rising edge of the clock input, even if the trigger condition does not persist until that edge occurs. U16 is the terminal fail-safe timer that services channel 1 and it is identical in design and function to that which was described above for U15.

Ideally, the clock source to each fail-safe timer would be independent and isolated. U8 is one of a pair of redundant divider stages used to create a degree of isolation between the time bases for the two fail-safe timers. U9 provides a divider function for the fail-safe timer for the other of the modem's channels (channel 1) in a manner that is identical to U8.

Figure 6:
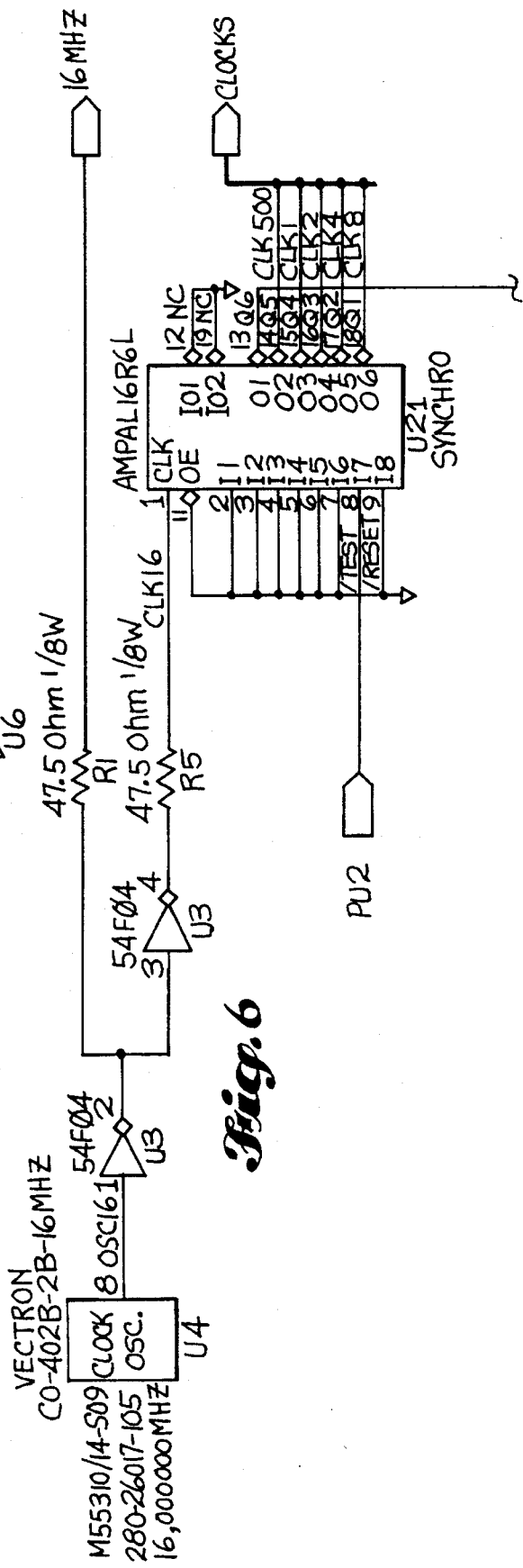
FIG. 6 is a schematic showing circuitry associated with clock generation.

FIG. 6 shows modem clock generation circuitry. U21 is a synchronous prescaler that provides five general purpose clocks for the subsystem interface, and a clock that drives redundant dividers U8 and U9 in FIG. 5, which in turn creates a time base for the fail safe timers shown in FIG. 5. This synchronous design results in controlled, minimal skew between all clock outputs. The design synchronously resets to an initial state and incorporates a test mode that allows full observability of all internal nodes when it undergoes testing with production test vectors.

Figure 7A:
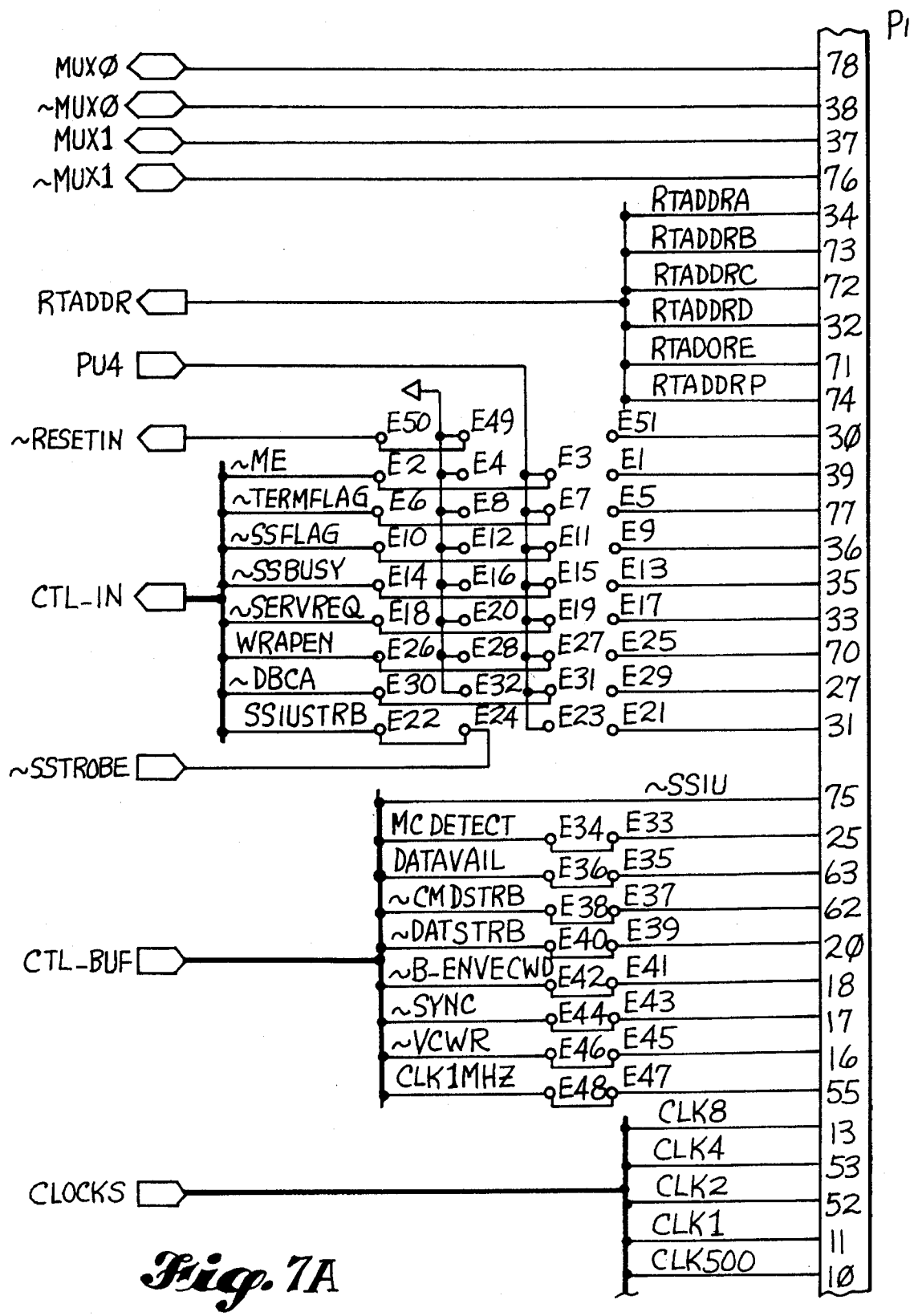
FIGS. 7A and 7B are schematics which are to be taken together, and show input/output connector and jumper details.
Figure 7B:
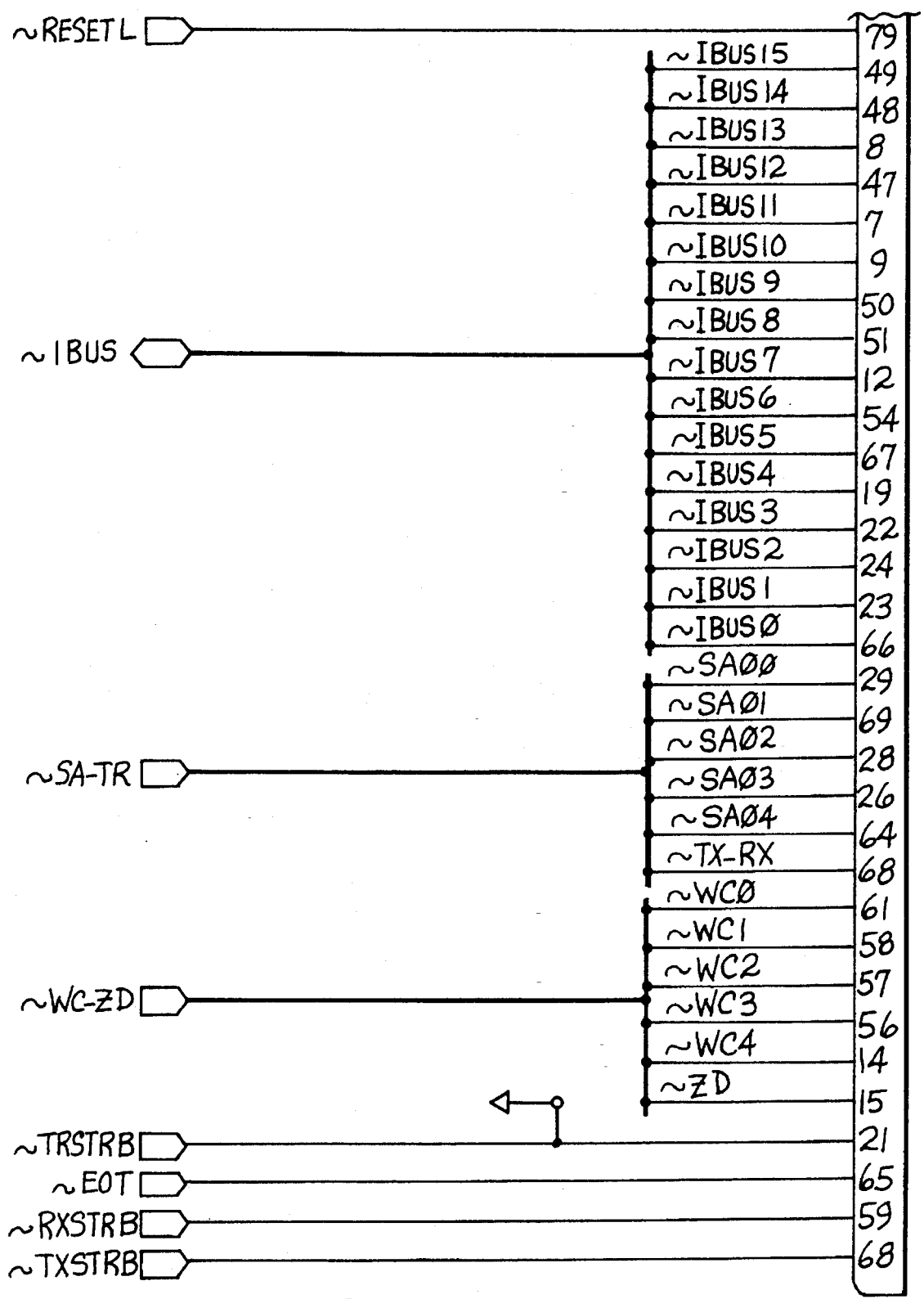

FIGS. 7A and 7B show connector and jumper details used to connect the modem in operative position between the subsystem and the multiplex databus. Connector and jumper details associated with PU4, RESETIN, CTL IN, SSTROBE, and CTL BUF are user selectable. The various names and codes associated with these two Figures are well-defined in the glossary. A person skilled in the art would be familiar with the actual physical connections.

Figure 8:
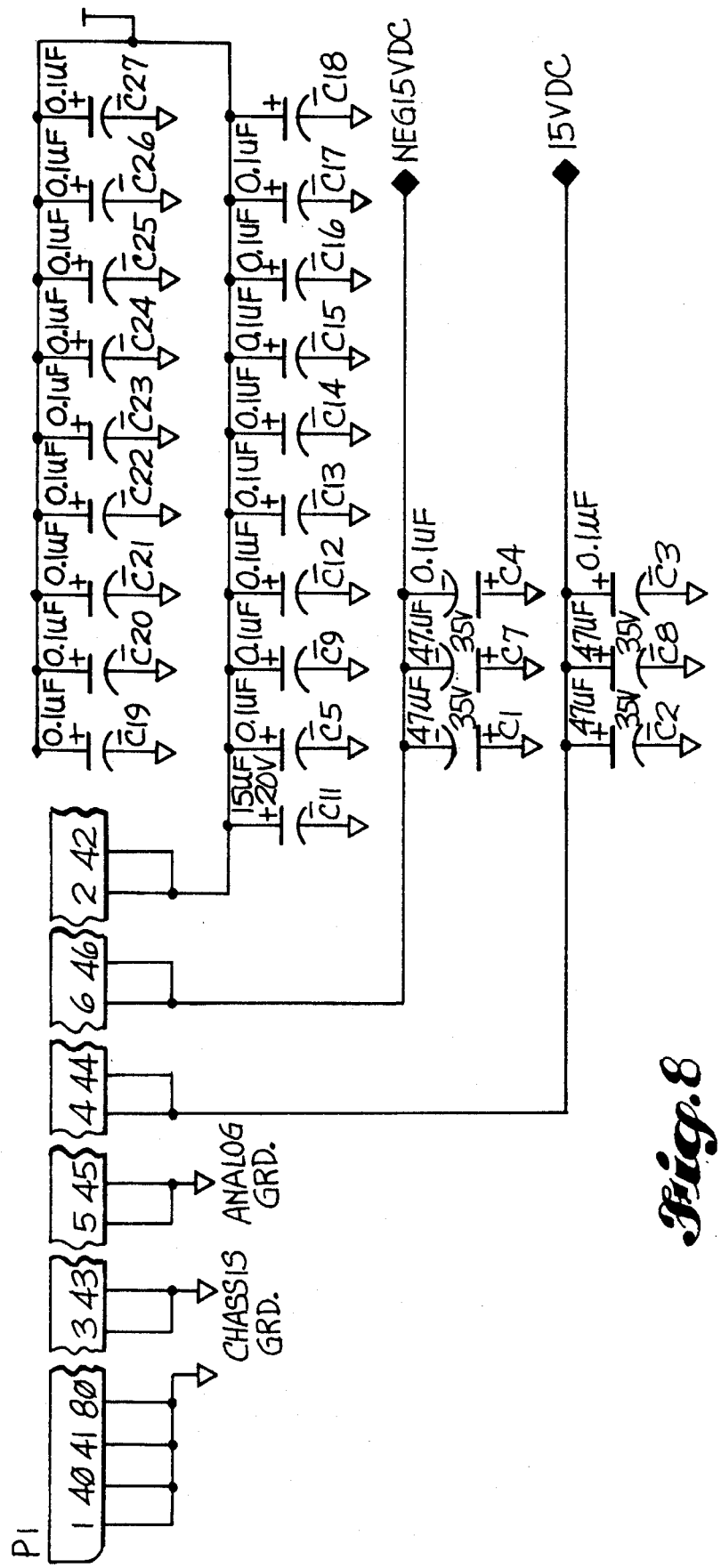
FIG. 8 is a schematic showing power distribution and decoupling circuitry.

FIG. 8 is a schematic showing a network of capacitors used to decouple those of the above-mentioned devices which are operationally connected to a power source. The purpose of this circuitry, which is well-known, is to prevent malfunction of the devices in the event of undesirable power surges, etc.

In the drawings, the various conventions indicating terms, codes and signal names would be familiar to a person skilled in the art. The same can be said for many of the more common parts shown in the drawings, such as certain inverters, "Nor" gates, etc. Of the above-described devices, many are of an off-the-shelf nature and would not require preprogramming by a maker of the invention. For example, devices U1, U2, U3, U4, U5, U6, U7, U8, U9, U10, U13, U14, U19, U20, and U21 fall into this category. Each one of these devices has a generic part number which is shown in the drawings and could be obtained from a variety of manufacturers without need of having further information. Certain others, i.e., U11, U15, U16, U21, U17, and U18 must be specially programmed by the maker of the invention.

Directing attention to FIGS. 7A and 7B certain symbolic conventions are used in connection with symbol names to indicate either unidirectional or bidirectional signals. For example, the signal convention in association with MUX0 at the top of page 7A indicates a bidirectional signal. Similarly, the signal convention used in connection with RESET L at the top of FIG. 7B indicates a unidirectional signal. These conventions are consistent throughout the various views and the signal names show how the various portions of the invention are connected together.

B. Modem Program

As mentioned above, devices U11, U15, U16, U21, U17 and U18 must be programmed by the maker of the invention. Accompanying herewith in Appendix A is the source code which a person skilled in the art would need. Part I of the Appendix is the source code for the word counter PLD U11. Part II contains the source code for the fail-safe timer PLDs U15, U16, respectively. Part III contains the source code for the synchronous counter PLD U21. Parts IV and V respectively contain the source code for the monitor PLD U17 and the interface PLD U18. The generic part numbers for each device are respectively identified in the programming. So are the pin numbers for each device and the logic used in association with each.

The modem's application to a particular task requires the user to create a simple decoding logic function that makes use of the self-timing subsystem interface of the modem. In the process of tailoring the modem to the application, a variety of digital logic technologies may be suitable for implementation of the user's decoder. This, of course, would be well-known to the person skilled in the art. However, programmable logic devices are recommended as providing the most convenient and efficient method of accomplishing this function. A typical modem application for example, will utilize a modem to service multiple subsystem modules, each of which employs a single PLD integrated circuit to perform the linkage between the modem and the subsystem module.

To accomplish the creation of the user-provided decoder, a requirement specification of the decoder would first be developed by identifying the specific fields of the databus message command word(s) that are to be accepted by the remote terminal. The requirements specification is then used to generate a set of logic expressions that completely specify the decoding function. At this point the complexity of the logic expressions, which is a function of the command word patterns selected by the user, will determine how the logic is to be partitioned into one or more PLD's. The logic expressions will include subsystem control signals that are provided by the modem to serve as qualifiers for each transaction, thus making the interface self-timing from the point-of-view of the user. A fuse pattern is generated from the logic expressions for each PLD to be programmed.

The preferred method of fuse pattern generation for a programmable logic device would involve the use of a validated compiler that generates fuse data compliant with industry standards. Many of such compilers are well-known in the art. The user would also generate a set of test vectors to verify proper functionality of the programmed PLD's. The PLD part(s) selected by the user is processed on a calibrated PLD programmer which programs parts in accordance with a programming algorithm that is specified by the manufacturer of the PLD. Many such programmers are well-known in the art. The process is completed by verification of proper functionality with the user's test vectors.

The process of physically accomplishing device programming as thus described in general terms would be familiar to a person skilled in the art. In this regard, a person skilled in the art could program the various devices in the modem as required by virtue of the information in parts I–V of the Appendix.

C. Glossary of Terms

1. MUX0, MUX1:

Root names for the signal connections of the modem to redundant channels (channels 0 and 1) of a data bus.

2. RTADDR:

Bundle of six signal lines used to uniquely identify the remote terminal. This group allows the selection of a 5-bit remote terminal address and includes a single bit for odd ones parity.

3. PU2, PU3, and PU4:

Voltage levels generated by devices U12, U8 and U6 respectively. These voltage levels provide constant, references which connect to unused gate inputs.

4. RESETIN:

Externally introduced reset signal for the modem user.

5. CTL_IN:

Modem input signal lines which are available to the user at the input/output connector and are jumper selectable. The definition of each input signal follows below:

a. ME: Message Error Bit (refer to MIL-STD-1553B paragraph 4.3.3.5.3.3).

b. TERMFLAG: Terminal Flag Bit (refer to MIL-STD-1553B paragraph 4.3.3.5.3.11).

c. SSFLAG: Subsystem Flag Bit (refer to MIL-STD-1553B paragraph 4.3.3.5.3.9).

d. SSBUSY: Busy Bit (refer to MIL-STD-1553B paragraph 4.3.3.5.3.8)

e. SERVREQ: Service Request Bit (refer to MIL-STD-1553B paragraph 4.3.3.5.3.5)

f. WRAPEN: Enable Wrap-Around Function (this is for test purposes only, it tests for transfers to and from the data bus controller without any subsystem transfers).

g. DBCA: Dynamic Bus Control Acceptance: Bit (refer to MIL-STD-1553B paragraph 4.3.3.5.3.10).

h. SSIUSTRB: Subsystem Interface Unit Strobe (generated internally and used to clock data in from subsystem).

i. SSTROBE: Subsystem Strobe. This is the signal name assigned to the signal generated by interface PAL U18. The signal name becomes SSIUSTRB after passing through the user selectable jumpers (E22 and E24).

6. CTL_BUF:

Signal name assigned to a group of signal lines that are outputs from the modem. These outputs are buffered internally and are made available to the user by the input/output connector and are jumper selectable. The definition for each CTL BUF signal follows below:

a. SSIU: Subsystem Interface Unit. This is an internally generated signal derrived from the raw SSIUSTRB signal.

b. MCDETECT: Mode Code Detect. A buffered signal used internally that becomes active when a mode code command is received by the modem (refer to MIL-STD-1553B paragraph 4.3.3.5.1.7).

c. DATAVAIL: Data Available. This is a control signal generated by the modem and made available to the user at the input/output connector. Data words received are available on a sixteen bit parallel bus (TBUS0–TBUS15) during a period When DATAVAIL is active. This allows the user to capture data as it comes in but prior to message validation.

d. CMDSTRB: Comand Strobe. This is an internal signal that is active when a valid transmit or receive message has been received.

e. DATSTRB: Data Strobe. This is a signal used to indicate that data is stable on the sixteen bit parallel bus (TBUS0–TBUS15) throughout the data strobe period. Preferably, DATSTRB is used to transfer data at a one megahertz rate to and from the subsystem.

f. B_ENVECWD (Same as ENVECWD): Enable Vector Word Signal. (Refer to MIL-STD-1553B paragraph 4.3.3.5.1.7.11).

g. SYNC: Synchronize. (Refer to MIL-STD-1553B paragraphs 4.3.3.5.1.7.2 and 4.3.3.5.1.7.12).

h. VCWR: Valid Command Word Received: (Refer to MIL-STD-1553B paragraphs 4.4.1.1 and 4.4.1.2)

i. CLK1MHZ: A general purpose one megahertz clock signal.

7. CLOCKS:

This is a name assigned to a group of signals which are clocks of various frequencies. Several are used internally. All except CLK250 are available to the user at the input/output connector:

a. CLK8: Eight megahertz clock signal used to generate main timing sequences.

b. CLK4: Four megahertz clock signal.

c. CLK2: Two megahertz clock signal.

d. CLK1: One megahertz clock signal.

e. CLK500: Five hundred kilohertz clock signal.

f. CLK250: Two hundred and fifty kilohertz clock signal.

8. RESETL:

System Reset (active low). This is a signal generated by tthe modem and is used internally to place modem electronics into a known state (refer to MIL-STD-1553B paragraph 4.3.3.5.1.7.9).

9. IBUS:

Sixteen bit parallel data bus (IBUS0–IBUS15) used to transfer data signals bidirectionally.

10. SA_TR:

Group of signal lines that contain subaddress signals and a transmit/receive bit.

11. WC_ZD:

Group of signal lines that contain word count signals to indicate the length of a data transfer, or to designate a special mode command, and a signal that indicates a remaining word count of zero.

12. TRSTRB:

Composite Strobe Signal, used to synchronize both transmit and receive transfers of data.

13. EOT:

Signal that confirms "end-of-transfer" when a message has been processed with no errors.

14. RXSTRB:

Signal that synchronizes only received messages.

15. TXSTRB:

Signal that synchronizes only transmit messages.

16. FSAFE0, FSAFE, and FSAFE1:

These are designations for signal groups that are part of a terminal fail-safe time out function.

17. CTL_OUT:

This designates a group of six outputs of device U17 that are used as conditional inputs to state machines that perform the subsystem interface logic.

18. TXINH1:

This is the signal driven by device U7, that inhibits the transmitter section of the transceiver device U1, which services channel 1.

19. TXINH0:

This is a signal driven by device U7 which inhibits the transmitter section of the transceiver device U1 servicing channel 0.

20. RXIN0:

Positive TTL data input to the decoder for channel 0.

21. TXOUT0:

Positive TTL data output from the encoder for channel 0.

22. SELEN0:

Indicates a valid message on channel 0 has caused selection of that channel to be enabled.

23. STATAVAIL:

Synchronized to presence of a message status word on T-bus

24. BITEOUT:

Initiates a built-in test sequence.

25. BITEIN:

Status of a built-in test sampled by device U17.

26. TXINH_IN:

Monitors combined transmitter inhibit activity for both channels.

27. RXIN1:

Positive TTL data input to the decoder for channel 1.

28. TXOUT1:

Positive TTL data output from the encoder for channel 1.

29. SELEN1:

Indicates a valid message on channel 1 has caused selection of that channel to be enabled.

30. RXIN0:

Positive data bus stub connection to receiver on channel 0.

31. RXOUT0:

Positive TTL receive data for channel 0.

32. TXOUT0:

Positive data bus stub connection to transmitter on channel 0.

33. TXIN0:

Positive TTL transmit data to be sent on channel 0.

34. RXIN1:

Positive data bus stub connection to receiver on channel 1.

35. RXOUT1:

Positive TTL receive data for channel 1.

36. TXOUT1:

Positive data bus stub connection to transmitter on channel 1.

37. TXIN1:

Positive TTL transmit data to be sent on channel 1.

In summary, a preferred embodiment of a modem constructed in accordance with this invention has been described above. Certain modifications could be made to the modem without departing from the spirit and scope of the invention. In this regard, and by way of nonlimitative example, certain changes could be made in the programming of certain devices in the modem which would cause the modem to function in exactly the same manner although the programming is slightly different. A person skilled in the art would, of course realize this. The scope of patent protection, therefore, is not to be limited by the above description. Rather, patent protection is to be limited by the patent claims which follow, and wherein such claims are to be interpreted in accordance with the well-established doctrines of patent claim interpretation.

What is claimed is:

1. Apparatus, in operative position between a data bus system and a subsystem, wherein said data bus system is operable to bidirectionally transmit sequential bits of information in accordance with certain preselected timing criteria, and further, said subsystem is operable to receive, process and output sequential bits of information in accordance with certain other preselected timing criteria, said timing criteria of said subsystem being different from said timing criteria of said data bus system, the apparatus comprising:

programmable subsystem interface means for interfacing said timing criteria of said subsystem with said timing criteria of said data bus system, wherein said programmable subsystem interface means includes inverting transceiver means operative for bidirectional transmission of data signals between said data bus system and said subsystem;

word counter means operative for transmission of word count signals between said bus system and said subsystem;

latch means operative for transmission of subaddress signals between said internal data bus system and said subsystem; and further including interface sequencing means for adjusting sequential timing of said data, word count and subaddress signals transferred between said data bus system and said subsystem, so that sequencing of such signals substantially matches said timing criteria of said subsystem, and for adjusting sequential timing of said data, word count and subaddress signals transferred between said subsystem and said data bus system, so that said sequencing of said signals in the later case substantially matches said timing criteria of said data bus system.

2. The apparatus of claim 1, wherein said interface sequencing means further includes an interface logic device operatively connected to said transceiver means, said word counter means and said latch means, said interface logic device having programmable means for controlling sequential timing of said signals, and for determining the direction of transmission of said signals between said data bus system and said subsystem: and a monitor logic device operatively connected to said interface logic device, said monitor logic device having programmable means for commanding said interface logic device to control sequential timing of said signals.

3. The apparatus of claim 2, wherein said apparatus includes dual, redundant input/output channels, one of said channels connecting said apparatus to said data bus system, the other of said channels connecting said apparatus to another data bus system, and including:

first means for providing a digital fail-safe timer for one of said channels, and second means for providing a digital fail-safe timer for the other of said channels.

4. The apparatus of claim 3, including connector means for providing user selectable input control signal lines, and for providing user selectable output control signal lines.

* * * * *

UNITED STATES PATENT AND TRADEMARK OFFICE
CERTIFICATE OF CORRECTION

PATENT NO. : 5,455,921
DATED : October 3, 1995
INVENTOR(S) : James M. DeFilipps and Gary Wood It is certified that error appears in the above-identified patent and that said Letters Patent is hereby corrected as shown below:

On title page, and Column 1,
In the Title [54], please change "MIL-STD-1153B" to
-- MIL-STD-1553B --

Signed and Sealed this

Twenty-ninth Day of April, 1997

Attest:

BRUCE LEHMAN

Attesting Officer

Commissioner of Patents and Trademarks